United States Patent [19]

Sasaki et al.

[11] Patent Number: 4,957,086
[45] Date of Patent: Sep. 18, 1990

[54] FUEL CONTROLLER FOR AN INTERNAL COMBUSTION ENGINE

[75] Inventors: Takeo Sasaki; Yoshiaki Kanno, both of Himeji, Japan

[73] Assignee: Mitsubishi Denki Kabushiki Kaisha, Tokyo, Japan

[21] Appl. No.: 311,788

[22] Filed: Feb. 17, 1989

[30] Foreign Application Priority Data

Feb. 18, 1988 [JP] Japan .................................. 63-36057

[51] Int. Cl.⁵ ............................................. F02D 41/04
[52] U.S. Cl. .................................... 123/478; 123/492; 364/431.05
[58] Field of Search ................ 123/478, 480, 486, 487, 123/488, 490, 492

[56] References Cited

U.S. PATENT DOCUMENTS 4,229,793 10/1980 Yoshida et al. .................. 123/486 X
4,582,035 4/1986 Kishi .............................. 123/490 X
4,721,087 1/1988 Kanno et al. ....................... 123/478

FOREIGN PATENT DOCUMENTS 52537 5/1981 Japan ................................... 123/490

Primary Examiner—Tony M. Argenbright
Attorney, Agent, or Firm—Sughrue, Mion, Zinn, Macpeak & Seas

[57] ABSTRACT

A fuel controller for an internal combustion engine has a control unit which calculates the amount of fuel to be supplied to the engine by fuel injectors and drives the fuel injectors with a prescribed timing. The timing of the fuel injection is advanced at high engine speeds. The fuel injection timing is set such that the fuel injection is performed substantially in synchrony with the calculation of the amount of fuel to be supplied even when the fuel injection timing is advanced.

11 Claims, 8 Drawing Sheets

FIG. 7(a) THROTTLE OPENING
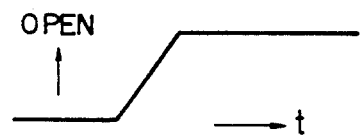
FIG. 7(b) Qa
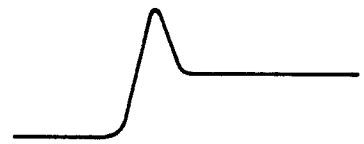
FIG. 7(c) Qe
FIG. 7(d) P
FIG. 7(e) ΔQe
FIG. 7(f) fu
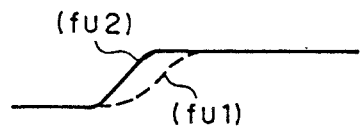

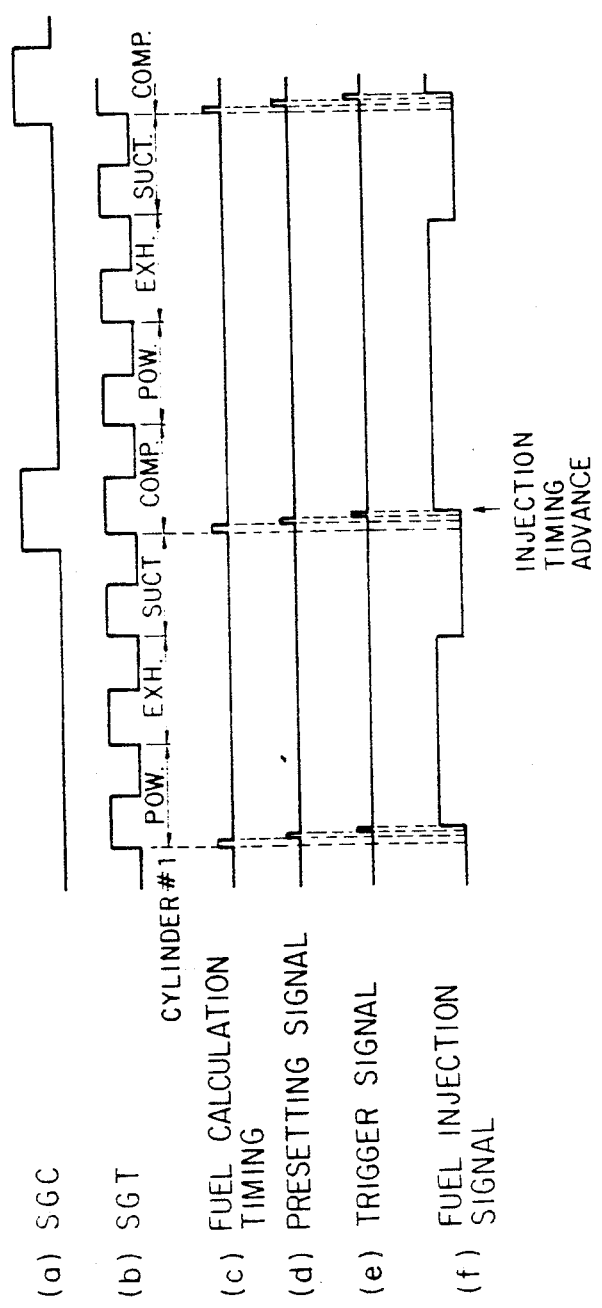

FUEL CONTROLLER FOR AN INTERNAL COMBUSTION ENGINE

BACKGROUND OF THE INVENTION

This invention relates to a fuel controller for an internal combustion engine which is equipped with a fuel injection system.

Generally, an internal combustion engine is equipped with an air flow sensor which is disposed upstream of the throttle valve and a crank angle sensor which is installed on the crankshaft of the engine. The amount of air which enters the engine between prescribed crankshaft angles is determined on the basis of the outputs of the air flow sensor and the crank angle sensor, and a fuel controller controls the amount of fuel which is supplied to the engine by fuel injectors in accordance with the amount of intake air and other operating parameters so as to attain a desired air-fuel ratio.

The timing with which fuel is supplied to the engine varies in accordance with the operating conditions. At a high engine rotational speed, the length of time for which each fuel injector is driven is increased, and the time at which fuel injection is started for each cylinder is advanced to an earlier portion of the engine operating cycle. For example, at low-speed operation, fuel injection generally starts during the power stroke of each cylinder, while at high speed operation, the start of fuel injection may be advanced into the compression stroke.

The amount of fuel which is to be supplied to the engine is calculated at prescribed time intervals regardless of the injecting timing, when the injection timing is advanced at high operational speeds, there may be a large time difference between the calculation of the amount of fuel to be supplied and the injection of the calculated amount of fuel. Accordingly, when the injection timing is advanced and thereafter, it becomes impossible to supply the necessary amount of fuel to the engine and a suitable air-fuel ratio ca not be obtained.

SUMMARY OF THE INVENTION

Accordingly, it is an object of the present invention to provide a fuel controller for an internal combustion engine which can supply the correct amount of fuel to an engine regardless of the rotational speed of the engine.

In a fuel controller in accordance with the present invention, fuel injection is performed substantially in synchrony with the calculation of the amount of fuel to be supplied. When the injection timing is advanced at high engine rotational speeds, fuel injection is maintained substantially in synchrony with the fuel supply calculation. Since fuel calculation is always performed immediately before fuel injection, the amount of fuel which is supplied always corresponds to the most recently determined engine operating state.

The calculation of the amount of fuel to be supplied to the engine is performed prior to the injection of the fuel, so calculation and fuel injection can not be in exact synchrony. However, as the fuel injection takes place almost immediately after the fuel supply is calculated, and as the time delay between the fuel calculation and fuel injection remains substantially constant over the speed of the engine, the fuel supply calculation is herein referred to as being "substantially" in synchrony with the fuel injection.

A fuel controller in accordance with the present invention comprises a fuel injector which supplies fuel to an engine, detecting means for detecting the engine operating state, and a control unit which comprises calculating means for calculating the appropriate amount of fuel to be supplied to the engine based on the detected engine operating state, fuel injector control means for driving the fuel injector substantially in synchrony with the calculation of the fuel amount for a period adequate to supply the calculated amount of fuel to the cylinder, and timing advance means for advancing the start of fuel injection by a prescribed amount while keeping the fuel amount calculation substantially in synchrony with the fuel injection when the detected engine operating state satisfies prescribed conditions.

In a preferred embodiment, the control unit comprises a microcomputer.

BRIEF DESCRIPTION OF THE DRAWINGS

FIGS. 7(a-f) are a graph of the changes in the values of various parameters when the throttle valve is suddenly opened.

FIGS. 8(a-f) are a waveform diagram showing supply calculation, fuel injection, and various other signals.

In the drawings, the same reference numerals indicate the same or corresponding parts.

DESCRIPTION OF THE PREFERRED EMBODIMENT

A preferred embodiment of the present invention will now be described while referring to the accompanying drawings, FIG. 1 of which schematically illustrates the overall structure of this embodiment a applied to a four-cylinder internal combustion engine.

Figure 1:
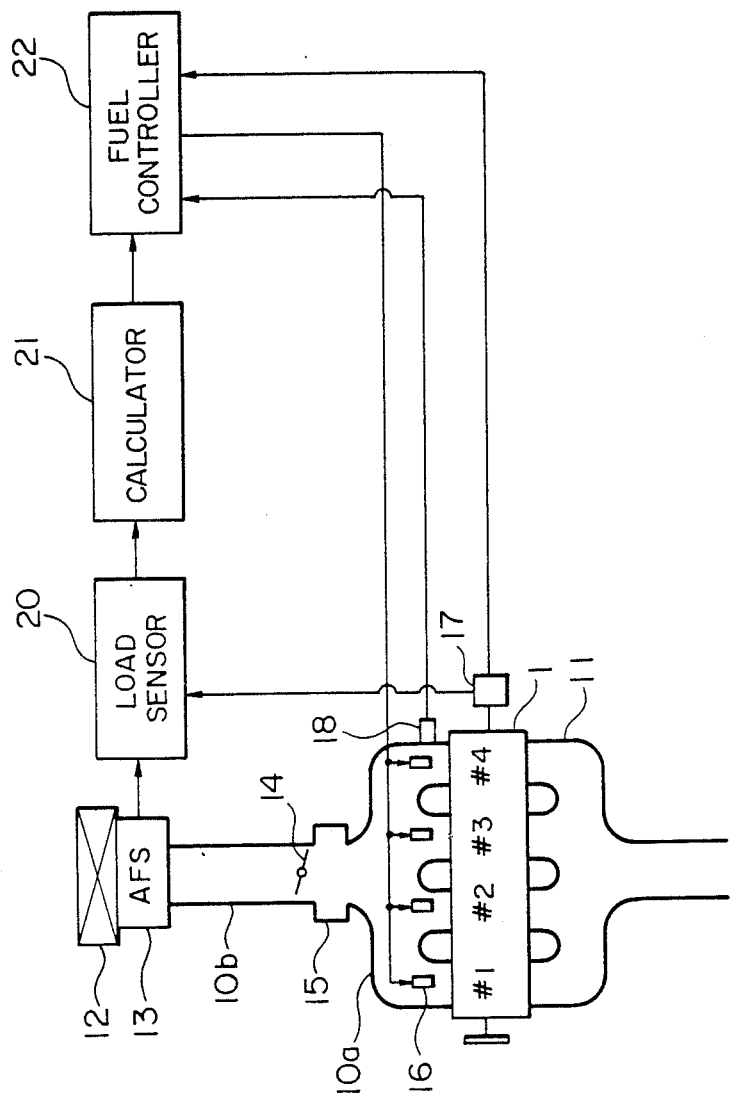
FIG. 1 is a schematic illustration of an embodiment of a fuel controller in accordance with the present invention as applied to a four-cylinder engine.

As shown in FIG. 1, an internal combustion engine 1 has four cylinders labeled #1 through #4. An intake manifold 10a is connected to one side of the engine 1 and an exhaust manifold 11 is connected to the other side. An intake pipe 10b is connected to the upstream end of the intake manifold 10a. A throttle valve 14 is rotatably mounted in the intake pipe 10b upstream of a surge tank 15, and an air cleaner 12 is installed at the upstream end of the intake pipe 10b. A Karman vortex air flow sensor 13 (hereinunder referred to as an AFS) is mounted on the intake pipe 10b between the throttle valve 14 and the air cleaner 12. It produces an electrical output signal in the form of pulses having a frequency corresponding to the rate at which intake air flows through the intake pipe 10b. A crank angle sensor 17 detects the rotation of the engine 1 and generates two electrical output signals: a crank angle signal SGT and a cylinder recognition signal SGC. The crank angle signal SGT is generated at prescribed crankshaft angles of the engine 1, such as once for every 180 degrees of crankshaft rotation. The crank angle signal SGT is in the form of a pulse which rises and falls at prescribed crankshaft angles, such as rising at 75° BTDC and falling at 5° BTDC. The cylinder recognition signal SGC is generated each time a prescribed cylinder is recognized. In the present embodiment, the cylinder recognition signal SGC is a pulse which rises each time the crankshaft is in a position such that the first cylinder is performing compression. Four fuel injectors 16a–16d for supplying fuel to the engine 1 are disposed in the intake manifold 10a near the unillustrated intake valves of the cylinders. The temperature of the engine cooling water is measured by a water temperature sensor 18 which comprises a thermistor or the like and which produces an electrical output signal corresponding to the temperature.

A load sensor 20 is connected to the AFS 13 and the crank angle sensor 17. It counts the number of output pulses of the AFS 13 between consecutive pulses of the crank angle signal SGT and produces a corresponding output signal which is input to a calculator 21. The calculator 21 calculates the rate at which air enters the engine based on the output of the load sensor 20 and produces a corresponding output signal. A controller 22 calculates and controls the drive time of the fuel injectors 16a–16d based on the outputs of the calculator 21, the crank angle sensor 17, and the water temperature sensor 18 so as to obtain a suitable air-fuel ratio corresponding to the air intake rate which was calculated by the calculator 21. The fuel controller 22 also advances the timing of the fuel injection under certain engine operating condition and maintains the fuel injection substantially synchronous with the fuel injection. The fuel controller 22 comprises a calculating device for calculating the appropriate amount of fuel to be supplied to the engine based on a detected engine operating state, a fuel injector controller for driving the fuel injector substantially in synchrony with the fuel amount calculation for a period adequate to supply the calculated amount of fuel to the cylinders of the engine, and a timing advance device for advancing the start of fuel injection by a prescribed amount while keeping the fuel amount calculation substantially in synchrony with the fuel injection when the detected engine operating state satisfies a prescribed condition.

Figure 2:
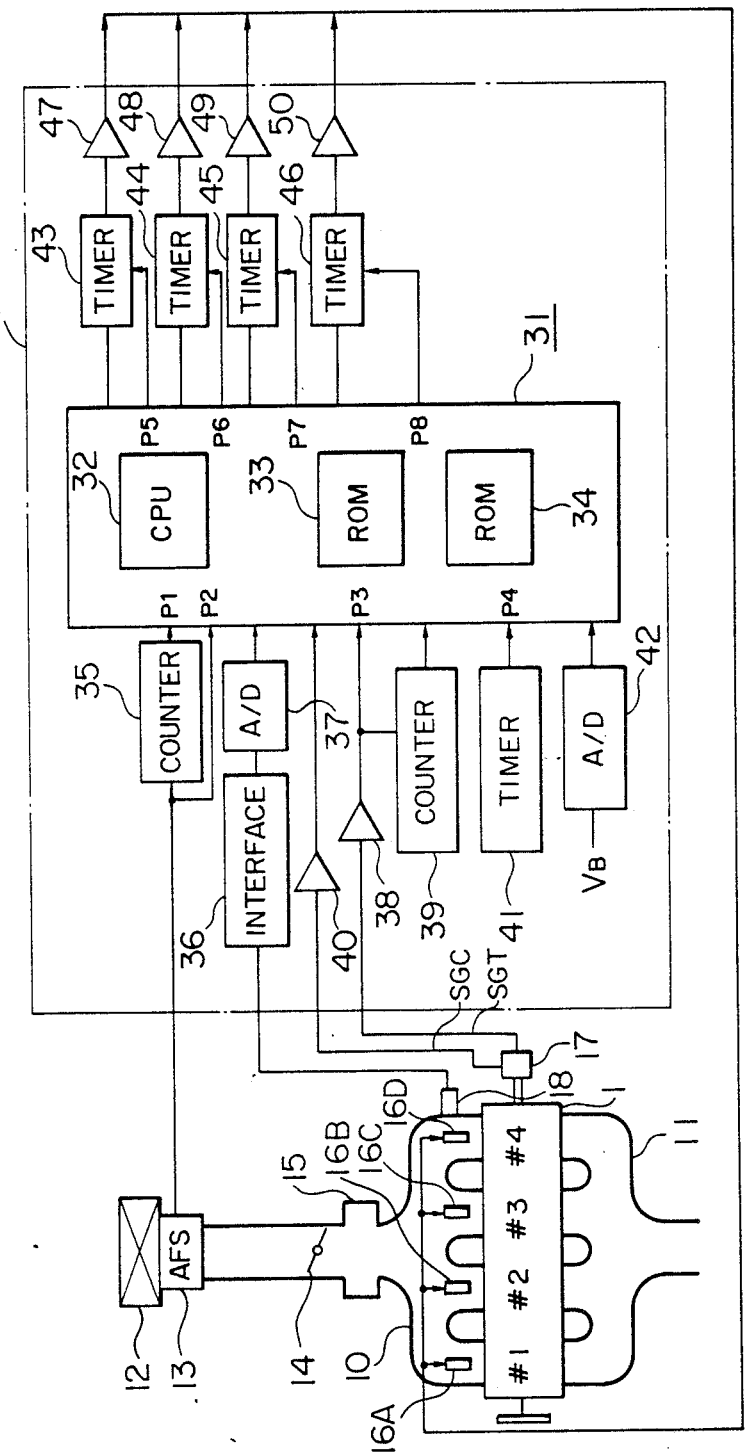
FIG. 2 is a schematic illustration which shows the structure of the embodiment of FIG. 1 in greater detail.
Figure 3:
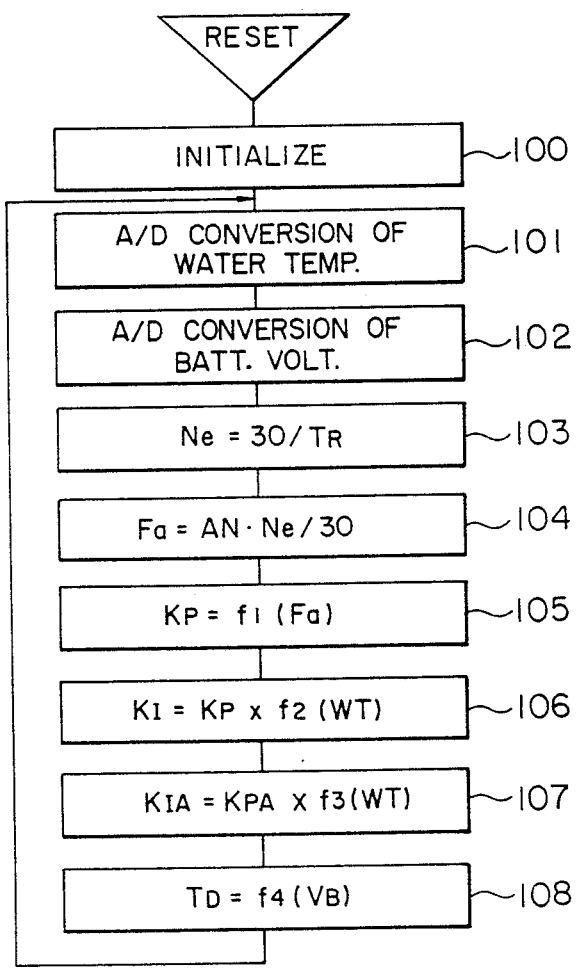
FIG. 3 is a flow chart of the main program performed by the microcomputer 31 of FIG. 2.
Figure 5:
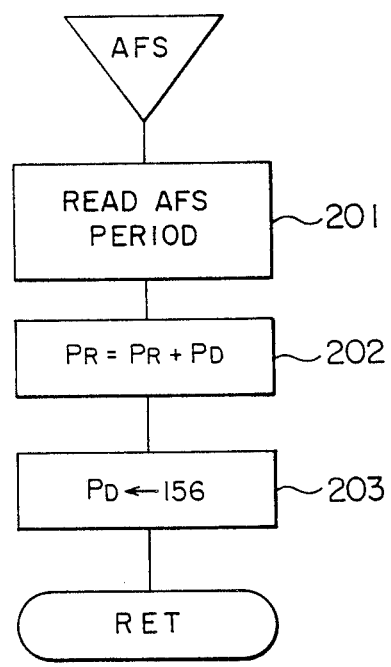
FIG. 5 is a flow chart of an interrupt handling routine performed by the microcomputer 31 of FIG. 2 each time there is a rise in the level of the AFS output signal.

FIG. 2 shows the structure of this embodiment more concretely. Elements numbers 20–22 of FIG. 1 are constituted by a control it 30 which controls the four fuel injectors 16a–16d. The control unit 30 is controlled by a microcomputer 31 having a CPU 32, a ROM 33 which stores data for calculations and the programs which are illustrated in FIGS. 3, 5, and 6, and a RAM 34. The output signal of the AFS 13 is input to a counter 35 and to an interrupt input port P2 of the microcomputer 31. The counter 35 measures the period of the AFS signal and provides a corresponding output signal to an input port P1 of the microcomputer 31. The output signal of the temperature sensor 18, which is an analog value, is input to an A/D converter 37 through an interface 36, and the digitalized value is input to the microcomputer 31. The crank angle signal SGT from the crank angle sensor 17 is input to a waveform shaper 38, and the shaped waveform is input to an interrupt input port P3 of the microcomputer 31 and to a counter 39. The cylinder recognition signal SGC of the crank angle sensor 17 is also input to the microcomputer 31 through a waveform shaper 40. A timer 41 is connected to an interrupt input port P4 of the microcomputer 31. An unillustrated battery for the engine is connected to an A/D converter 42 which produces a digital output signal corresponding to the voltage VB of the battery and outputs the signal to the microcomputer 31. Four timers 43–46 are preset by the microcomputer 31 to a prescribed value and are triggered by output signals from output ports P5–P8, respectively, of the microcomputer 31. The output terminals of timers 43–46 are connected to fuel injectors 16a–16d, respectively, through corresponding drivers 47–50, respectively.

Next, the operation of the embodiment illustrated in FIG. 2 will be explained. The output of the AFS 13 is input to counter 35 which measures the period between the rising edges of the output of the AFS 13. Each time there is a rise in the level of the output signal of the AFS 13, which is input to interrupt input port P2, the CPU 32 performs an interrupt handling routine and the period of counter 35 is measured. The output of the water temperature sensor 18 is converted into a voltage by interface 36, the output of interface 36 is changed into a digital value by A/D converter 37 at prescribed intervals, and the output of A/D converter 37 is input to the microcomputer 31. The crank angle signal SGT is input to interrupt input port P3 of the microcomputer 31 and to counter 39 through waveform shaper 38. The microcomputer 31 performs an interrupt handling routine on each rising edge of the crank angle signal SGT, and the period between the rising edges of the crank angle signal SGT is determined based on the output of counter 39. The level of the cylinder recognition signal SGC of the crank angle sensor 17 is checked upon each rising edge of the crank angle signal SGT and it is determined whether or not the first cylinder is performing compression. At prescribed intervals, timer 41 generates an interrupt request, which is applied to interrupt input port P4 of the microcomputer 31. A/D converter 42 performs A/D conversion of the voltage VB of the unillustrated battery, and at prescribed intervals, the microcomputer 31 reads this battery voltage data. Timers 43–46 are preset by the microcomputer 31 and are triggered by signals from output ports P2–P6, respectively, of the microcomputer 31. Each timer outputs a pulse of a prescribed width, and this output pulse drives a corresponding one of the fuel injectors 16a–16d through one of the drivers 47–50.

Figure 4:
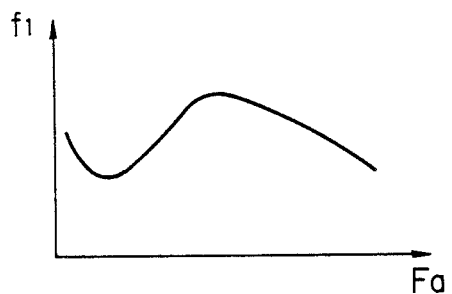
FIG. 4 is a diagram showing the relationship between a function fl for determining a fundamental injection timing conversion coefficient and the output frequency Fa of the AFS of the embodiment of FIG. 2.

Next, the operation of the CPU 32 will be explained while referring to the flow charts of FIGS. 3, 5, and 6. FIG. 3 illustrates the main program of the CPU 32. When a reset signal is input to the CPU 32, in Step 100, the RAM 34, the input ports, and the like are initialized. In Step 101, A/D conversion of the output of the water temperature sensor 18 is performed and the result is stored in the RAM 34 as WT. In Step 102, A/D conversion of the battery voltage is performed and the result is stored in the RAM 34 as VB. In Step 103, the rotational speed Ne in RPM of the engine is determined by calculating the value of 30/TR, wherein TR is the period in seconds of the crank angle signal SGT and equals the time for the crankshaft to rotate 180 degrees. In Step 104, the frequency Fa of the output signal of the AFS 13 is calculated by the equation AN x Ne/30. AN is referred to as load data; it is equal to the number of output pulses which are generated by the AFS 13 between the rising edges of two consecutive pulses of the crank angle signal SGT and is indicative of the engine load. In Step 105, based on the output frequency Fa, a basic injection timing conversion coefficient Kp is calculated using a function f1 which has a value with respect to Fa as shown in FIG. 4. In Step 106, the basic injection timing conversion coefficient Kp is corrected by a function f2, which is a function of the water temperature data WT, and the corrected value is stored in the RAM 34 as injection timing conversion coefficient $K_I$. In Step 107, a transient correction drive time conversion coefficient $K_{IA}$ is calculated using the formula $K_{IA} = K_{PA} \times f3(WT)$, wherein $K_{PA}$ is a constant and f3 is a water-temperature-corrected acceleration increase coefficient which is a function of the water temperature WT. The value of f3 is stored in a data table in the ROM 33. The calculated value of $K_{IA}$ is stored in the RAM 34. In Step 108, based on the battery voltage VB, the dead time $T_D$ is determined from the data table F4 which is stored in the ROM 33 and gives the dead time $T_D$ as a function of the battery voltage VB. The result is stored in the RAM 34. After Step 108, the program recycles by returning to Step 101.

FIG. 5 illustrates an interrupt handling routine which is performed by the CPU 32 each time there is an interrupt request to interrupt input port P2, i.e., whenever the level of the AFS signal rises. In Step 201, the output of counter 35 is read, and then counter 35 is cleared. The output of counter 35 is stored in the RAM 34 as TA and is the period between consecutive rises in the output of the AFS 13. In Step 202, a value referred to as the remaining pulse data PD is added to the cumulative pulse data PR to obtain a new value for the cumulative pulse data PR. The cumulative pulse data PR is the total number of pulses which are output by the AFS 13 between consecutive rises in the level of the crank angle signal SGT. For convenience of processing, PR is incremented by 156 for each pulse from the AFS 13, so that the value of PR equals 156 times the actual number of output pulses of the AFS 13. In Step 203, the remaining pulse data PD is set equal to 156. After Step 203, the interrupt handling routine of FIG. 5 is completed and the main program is returned to.

Figure 6A:
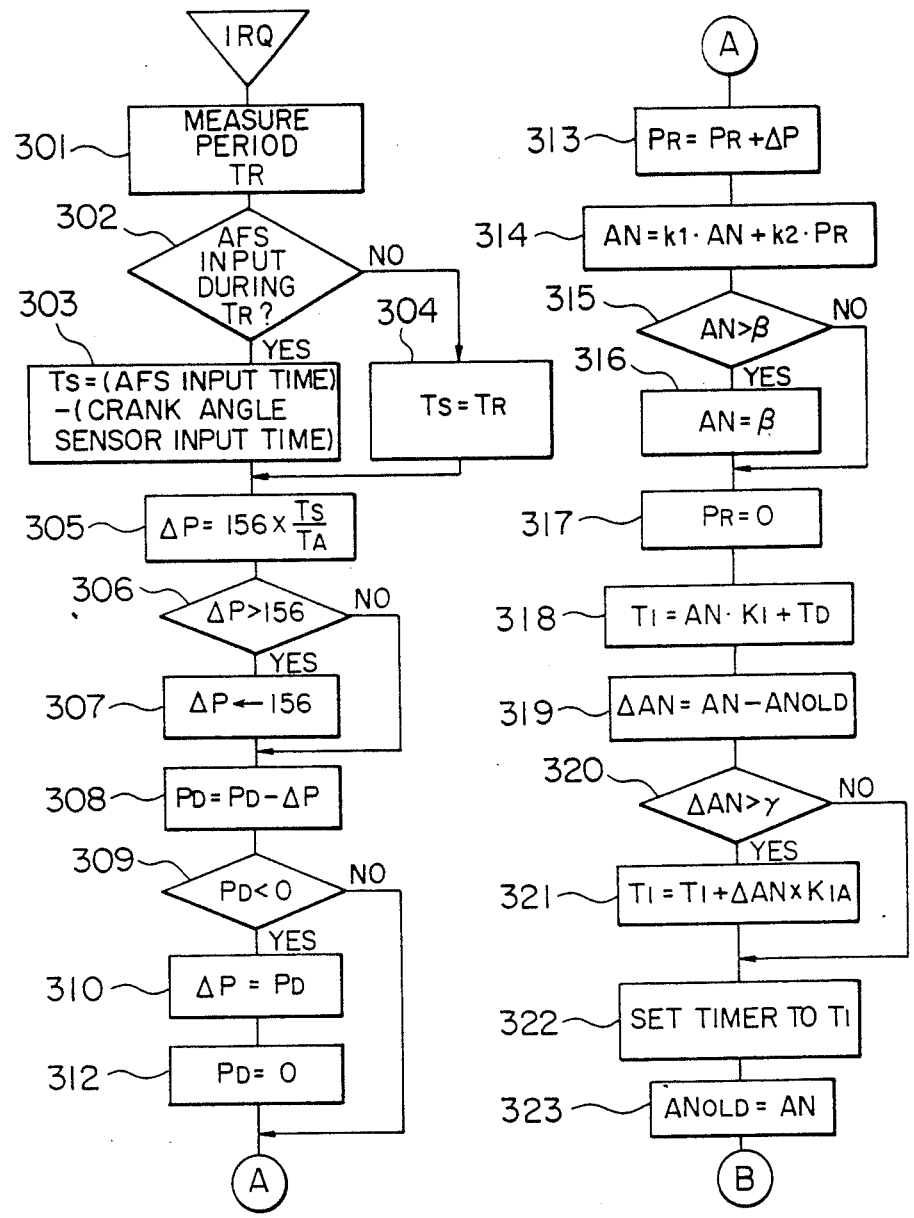
FIGS. 6a and 6b are a flow chart of an interrupt handling routine which is performed each time there is a rise in the level of the crank angle signal.
Figure 6B:
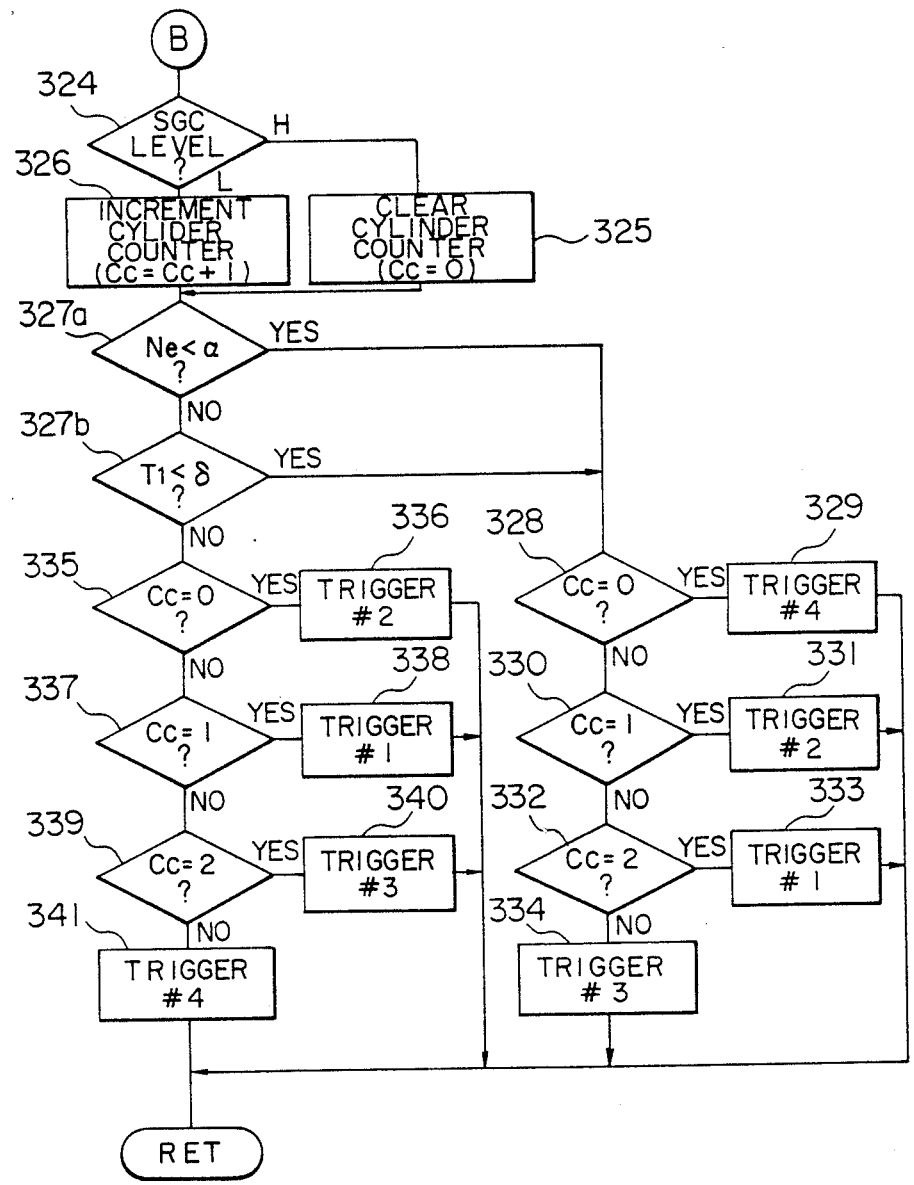

FIGS. 6a and 6b are a flow chart of an interrupt handling routine which is performed by the CPU 32 when an interrupt request is input to interrupt input port P3 of the microcomputer 31 each time the level of the crank angle signal SGT rises. In Step 301, the period between the most recent rise and the previous rise in the level of the crank angle signal SGT is read from counter 39 and is stored in the RAM 34 as period TR. Counter 39 is then cleared. In Step 302, it is determined whether there was an output pulse from the AFS 13 during the period TR. If so, then in Step 303, the time difference TS between the time of the most recent output pulse of the AFS 13 and the time of the most recent interrupt request from the crank angle sensor 17 is calculated. When there was no output pulse from the AFS 13 during period TR, then in Step 304, period TS is set equal to period TR. In Step 305, the time difference TS is converted into pulse data $\Delta^P$ using the formula $\Delta^P = 156 \times TS/TA$. The pulse data $\Delta^P$ is the amount by which the cumulative pulse data PR should be increased for the length of time TS. In Step 306, if the value of the pulse data $\Delta^P$ is less than or equal to 156, then the routine proceeds to Step 308, and if it is larger, then in Step 307, $\Delta^P$ is reduced to 156. In Step 308, the remaining pulse data PD is decreased by the pulse data $\Delta^P$, and the decreased value is made the new remaining pulse data PD. In Step 309, if the remaining pulse data PD is positive or zero, then the routine proceeds to Step 313, and otherwise, the calculated value of the pulse data $\Delta^P$ is too much greater than the output pulse of the AFS 13, so in Step 310, the pulse data $\Delta^P$ is set equal to PD, and in Step 312, the remaining pulse data PD is set equal to zero. In Step 313, the cumulative pulse data PR is increased by the pulse data $\Delta^P$ and a new value for the cumulative pulse data PR is obtained. The cumulative pulse data PR is proportional to the number of pulses which it is thought that the AFS 13 output between consecutive rises in the crank angle signal SGT.

During a period of transition, the amount of air which is sucked into the engine between consecutive rises in the level of the crank angle signal SGT is not equal to the amount which is measured by the AFS 13 during the same period. If the amount of intake air which is detected by the AFS 13 between the most recent two consecutive rises in the level of the crank angle signal SGT (during the most recent 180 degrees of crankshaft rotation) is AN(t) and the actual amount of air which was sucked into the engine 1 during the preceding 180 degrees of crankshaft rotation is AN(n−1), then the actual amount of air AN(n) which was sucked into the engine during the most recent 180 degrees of crankshaft rotation is given by the following formula:

$$AN(n) = K1 \times AN(n-1) + K2 \times AN(t) \tag{1}$$

wherein K1 and K2 are constants. In Step 314, a calculation corresponding to this equation is performed to determine the actual amount of air sucked into the engine. Namely, the value of $k1 \cdot AN + k2 \cdot PR$ is calculated using the load data AN which was calculated up to the preceding rising edge of the crank angle signal SGT, the, cumulative pulse data PR, and filter constants k1 and k2. The result is made the new load data AN.

In Step 315, if the new load data AN exceeds a prescribed value $\beta$, then in Step 316, AN is decreased to $\beta$ so that even when the throttle valve 14 is fully open, the load data AN will not be too much larger than the actual value. If AN is less than or equal to $\beta$, then the routine advances to Step 317 in which the cumulative pulse data PR is set equal to 0. In Step 318, injection timing data $T_I$ is calculated based on the load data AN, the injection timing conversion coefficient $K_I$, and the dead time $T_D$ in the manner $T_I = (AN \times K_I) + T_D$. In Step 319, the difference between the new load data AN and the old load data $AN_{old}$ is determined, and in Step 320, the difference is compared with a prescribed value $\gamma$. In Step 320, if the difference is less than or equal to $\gamma$, then Step 322 is performed, and if the difference exceeds $\gamma$, then in Step 321, a new value of the injection timing data $T_I$ is calculated using the value of $T_I$ which was determined in Step 318, the difference determined in Step 319, and the transient injection timing conversion coefficient $K_{IA}$ which was previously stored in the RAM 34 using the formula $T_I = T_I + \Delta^{AN} \times K_{IA}$. In Step 322, the injection timing data $T_I$ is preset in the four timers 43–46. In Step 323, the present load data AN is stored in the RAM 34 as the old load data $AN_{old}$.

In Step 324, the level of the cylinder recognition signal SGC from the crank angle sensor 17 is determined. If the cylinder recognition signal SGC is high, then in Step 325, a variable referred to as the cylinder counter Cc is set equal to 0. If the cylinder recognition signal SGC is low, then in Step 326, the cylinder counter, Cc is increased by 1.

In the present embodiment, the injection timing is advanced by 1 stroke (by 180° of crankshaft rotation) if certain engine operating conditions exist. These conditions exist when the engine rotational speed Ne is greater than a prescribed speed, or when the injection pulse width is greater than a prescribed width. The determination of whether these conditions exist is made in Steps 327a and 327b. In Step 327a, it is determined whether the rotational speed Ne of the engine is less than a prescribed rotational speed $\alpha$. If so, then Step 328 is performed, but if it is not smaller, Step 327b is performed. In Step 327b, it is determined whether the injection timing data $T_I$ is less than a prescribed value $\delta$. If it is smaller, then Step 328 is performed, and if it is not, then Step 335 is performed. In Step 328, it is determined whether the cylinder counter Cc is 0. If it is not 0, then in Step 329, the fourth timer 46 is triggered and the fourth fuel injector 16d is driven. If it is 0, then in Step 330 it is determined whether the cylinder counter is 1. If it is 1, then in Step 331 the second timer 44 is triggered and the second fuel injector 16b is driven. If it is not 1, then Step 332 is performed and it is determined whether the cylinder counter is 2. If it is 2, then in Step 333, the first timer 43 is triggered and the first fuel injector 16a is driven. If it is not 2, then it must be 3, so in Step 334, the third timer 45 is triggered and the third fuel injector 16c is driven.

In Step 335, it is determined whether the cylinder counter is 0. If it is 0, then in Step 336, the second timer 44 is triggered and the second fuel injector 16b is driven. If it is not 0, then in Step 337, it is determined whether the cylinder counter is 1. If it is 1, in Step 338, the first timer 33 is triggered and the first fuel injector 16a is driven, and if it is not 1, then Step 339 is performed. In Step 339, it is determined whether the cylinder counter is 2. If it is 2, then in Step 340, the third timer 45 is triggered and the third fuel injector 16c is driven. If it is not 2, then in Step 341, the fourth timer 46 is triggered and the fourth fuel injector 16d is driven.

It can be seen that Steps 335-341 are performed when the fuel injection timing is normal, and Steps 328-334 are performed when the fuel injection timing is advanced. In either case, the order in which injection is performed (cylinder 2, cylinder 1, cylinder 3, cylinder 4) is the same. However, when the fuel injection timing is advanced, each cylinder is supplied fuel one stroke earlier than it would be with normal fuel injection timing.

Each time that the interrupt handling routine of FIGS. 6a and 6b is performed, one of the fuel injectors 16a-16d is driven and then the main program is returned to.

FIG. 7 shows the changes in various parameters when the throttle valve 14 is suddenly opened. Curve (a) shows the degree of opening of the throttle valve 14. Curve (b) shows the amount of air Qa at which air flows through the AFS 13 between prescribed crankshaft angles. Qa initially overshoots and then decreases to a steady-state value. Curve (c) shows the amount of air Qe which actually enters the engine during the same period. Because of the presence of the surge tank 15, Qe increases more gradually than does Qa. Curve (d) shows the pressure P within the surge tank. Curve (e) shows the time rate of change of Qe. Curve (f) shows the amount of fuel fu which is supplied to the engine. fu1 indicates a value which is calculated on the basis of curve Qe, and fu2 indicates a value which is corrected on the basis of curve (e). If the amount of air which passed through the AFS 13 between the occurrence of two prescribed crankshaft angles is Qa(n) and the amount of air which actually entered the engine between the previous occurrence of the two prescribed crankshaft angles is Qe(n-1), then the actual amount of air which entered the engine between the occurrence of the two prescribed crankshaft angles is given by the following formula which corresponds to Equation (1), wherein K1 and K2 are constants.

$$Qe(n) = K1 \times Qe(n-1) + K2 \times Qa(n) \tag{2}$$

The length of time required for each stroke of the pistons of the engine is inversely proportional to the engine rotational speed. At 6000 rpm, for example, the length of each stroke is approximately 5 msec. Therefore, the injection pulse width (12-15 msec) becomes longer relative to the stroke length as the rotational speed increases. If the timing of the start of fuel injection remains constant regardless of the engine rotational speed (such as coinciding with the start of the power stroke), at a high rotational speed, the necessary amount of fuel can not be supplied to the intake manifold before the suction stroke starts.

In the present invention, in order to assure an adequate supply of fuel at high engine speeds, the injection timing is advanced at a high engine speed. The advancing of injection timing is illustrated in FIG. 8. (a) and (b) show the values of the cylinder recognition signal SGC and the crank angle signal SGT of the crank angle sensor 17. The state in the first cylinder of the engine 1 (POW=power stroke, EXH=exhaust stroke, SUCT=suction stroke, and COMP=compression stroke) is indicated beneath curve (b). (c) shows the timing of the calculation of the amount of fuel to be supplied. The fuel supply is calculated immediately after a rise in the level of the crank angle signal SGT. Immediately after the calculation, the calculated result is preset in timers 43-46, as shown in (d). Immediately after the timers are preset, it is determined which timer should be triggered, and a trigger signal is applied to the appropriate one of the four timers as shown in (e). The timer which was triggered immediately applies a pulse of a prescribed width to the corresponding cylinder as shown in (f), and fuel is supplied to the appropriate cylinder. In FIG. 8, for the sake of simplicity, the trigger signal and the fuel injection signal have only been illustrated for the first cylinder.

During a normal operating state (when the engine rotational speed is below a prescribed speed or the injection pulse width is less than a prescribed width), there is no injection timing advance, and as shown in FIG. 8, fuel injection is started in the power stroke. However, when the engine rotational speed exceeds a prescribed speed or the injection pulse width is greater than a prescribed width, the injection timing is advanced so that fuel injection begins in the compression stroke. The point in time at which the injection timing begins to be advanced is indicated by the arrow below curve (f) of FIG. 8.

If the calculation of the amount of fuel to be injected into the cylinders is performed with a timing which has no relation to the fuel injection timing, when the start of fuel injection is advanced, the fuel supply can no longer be controlled so as to immediately respond to changes in engine operating conditions. Therefore, in the present invention as shown in FIG. 8, even when the injection timing is advanced, fuel injection continues to be performed substantially in synchrony with the calculation of the amount of fuel to be supplied. Thus, there is substantially no delay between the calculation of the amount of fuel to be supplied and the injection of the calculated amount, and the amount of fuel which is supplied corresponds to the most recently determined engine operating state. Therefore, the correct amount of fuel can always be supplied to the engine regardless of the engine speed.

In the above-described embodiment, the number of output pulses of the AFS 13 was counted between consecutive rising edges of the crank angle signal SGT, but the number of AFS output pulses can instead be counted between consecutive falling edges of the crank angle signal SGT. It is also possible to count the number of AFS output pulses over several periods of the crank angle signal SGT.

In addition, the above-described embodiment, the number of output pulses of the AFS 13 was counted, but it is instead possible to count the number of output pulses multiplied by a constant corresponding to the frequency of the AFS output signal.

Furthermore, instead of using a crank angle sensor 17, the rotation of the engine can be detected using the ignition signal for the engine with the same effects.

What is claimed is:

1. A fuel supply controller for an internal combustion engine comprising:
    a fuel injector which supplies fuel to a cylinder of an engine;
    detecting means for detecting the operating state of the engine; and
    a control unit including calculating means for calculating the appropriate amount of fuel to be supplied to the engine based on the detected engine operating state, fuel injector control means for driving said fuel injector subsequent to the fuel amount calculation for the length of time adequate to supply the calculated amount of fuel to the cylinder, and timing advance means for simultaneously advancing the start of fuel injection by said fuel injector by a prescribed amount and advancing the fuel amount calculation by substantially the same amount when the detected engine operating sate satisfies a prescribed condition so that a time delay between the fuel amount calculation and the fuel injection is substantially constant.

2. A fuel controller as claimed in claim 1, wherein said control unit is a microcomputer.

3. A fuel controller as claimed in claim 1, wherein:
    said detecting means comprises a crank angle sensor which generates a crank angle signal at prescribed crankshaft angles of said engine, said timing advance means operating in response to said crank angle signal.

4. A fuel controller as claimed in claim 3, wherein:
    said calculating means comprises means for applying to said fuel injector a drive pulse having a width adequate to supply said calculated amount of fuel to said cylinder; and
    said timing advance means comprises means for advancing the start of fuel injection when the period of the crank angle signal is less than a prescribed length or the width of the drive pulse is greater than a prescribed width.

5. A fuel controller as claimed in claim 3, wherein said fuel amount calculation is performed substantially upon the occurrence of a prescribed change in the level of the crank angle signal of said crank angle sensor.

6. A fuel controller as claimed in claim 1, wherein said predetermined amount of advancement of the start of fuel injection substantially corresponds to 180° of crankshaft rotation.

7. A fuel control method for an internal combustion engine comprising:
    detecting the operating state of an engine;
    calculating the amount of fuel to be supplied to the engine on the basis of the detected operating state;
    injecting the calculated amount of fuel into a cylinder of the engine with a prescribed timing subsequent to the calculation of the amount of fuel; and
    simultaneously advancing the start of fuel injection by said fuel injector by a prescribed amount when the detected engine operating state satisfies a prescribed condition and advancing the fuel amount calculation by substantially the same amount so that a time delay between the fuel amount calculation and the fuel injection is substantially constant.

8. A method as claimed in claim 7, wherein said detecting step comprises detecting the rotational speed of the engine and the amount of air which enters the engine between prescribed crankshaft angles.

9. A method as claimed in claim 7, wherein said injecting step comprises applying to a fuel injector a drive pulse having a width adequate to supply the calculated amount of fuel to the cylinder.

10. A method as claimed in claim 9, wherein said prescribed condition for advancing the start of injection is when the rotational speed of the engine is higher than a prescribed speed or when the width of the drive pulse is greater than a prescribed width.

11. A method as claimed in claim 7, wherein said predetermined amount of advancement of the start of fuel injection substantially corresponds to 180° of crankshaft rotation.

* * * * *